(12) United States Patent
Pellikka

(10) Patent No.: US 10,628,698 B1
(45) Date of Patent: Apr. 21, 2020

(54) METHOD FOR IMAGE STITCHING

(71) Applicant: Grundium Oy, Tampere (FI)

(72) Inventor: Matti Pellikka, Lempäälä (FI)

(73) Assignee: Grundium Oy, Tampere (FI)

( * ) Notice: Subject to any disclaimer, the term of this patent is extended or adjusted under 35 U.S.C. 154(b) by 0 days.

(21) Appl. No.: 16/459,641

(22) Filed: Jul. 2, 2019

(51) Int. Cl.
| | |
|---|---|
| G06K 9/00 | (2006.01) |
| G06K 9/34 | (2006.01) |
| G06T 7/174 | (2017.01) |
| G06N 3/08 | (2006.01) |
| G06T 7/13 | (2017.01) |
| G06K 9/20 | (2006.01) |

(52) U.S. Cl.
CPC ............ G06K 9/342 (2013.01); G06N 3/082 (2013.01); G06T 7/13 (2017.01); G06T 7/174 (2017.01); *G06K 2009/2045* (2013.01)

(58) Field of Classification Search
CPC .. G06K 9/342; G06K 2009/2045; G06T 7/13; G06T 7/174; G06T 3/4038; G06T 2207/20221–20224; G06N 3/082
See application file for complete search history.

(56) References Cited

U.S. PATENT DOCUMENTS

| | | | | |
|---|---|---|---|---|
| 5,986,668 A * | 11/1999 | Szeliski | ................. | G06T 7/33 345/634 |
| 6,018,349 A * | 1/2000 | Szeliski | ................. | G06T 3/0068 345/629 |
| 6,097,854 A * | 8/2000 | Szeliski | ................. | G06K 9/209 345/634 |
| 6,157,747 A * | 12/2000 | Szeliski | ................. | G06K 9/209 345/419 |
| 7,995,861 B2 * | 8/2011 | Jin | ................. | G06T 3/4038 345/629 |
| 8,200,039 B2 * | 6/2012 | Jin | ................. | G06T 7/30 382/276 |
| 9,390,530 B2 * | 7/2016 | Scherling | ........... | H04N 5/23238 |
| 9,594,826 B2 * | 3/2017 | Jing | ................. | G06K 9/6254 |
| 9,712,746 B2 * | 7/2017 | Arcas | ................. | G06T 3/4038 |
| 10,387,996 B2 * | 8/2019 | Cohen | ................. | G06T 3/0075 |
| 10,410,321 B2 * | 9/2019 | Ilic | ................. | G06T 11/60 |
| 2008/0143745 A1 * | 6/2008 | Jin | ................. | G06T 3/4038 345/629 |
| 2008/0247667 A1 * | 10/2008 | Jin | ................. | G06T 3/4038 382/284 |

(Continued)

*Primary Examiner* — Aaron W Carter
(74) *Attorney, Agent, or Firm* — Laine IP Oy

(57) ABSTRACT

There is provided a method comprising receiving at least three images, wherein the images form a number of partially overlapping image pairs, wherein the number of partially overlapping image pairs is at least a number of the received images; forming one or more candidate transformations between the images of the image pairs; constructing a multigraph comprising nodes representing nodal transformations from a composite image to the images of the at least three images, and edges between the nodes, the edges representing the one or more candidate transformations; solving edge weights and the nodal transformations using an optimization problem, wherein the edge weights indicate plausibility of the one or more candidate transformations; and applying the solved nodal transformations in forming the composite image of the at least three images.

20 Claims, 7 Drawing Sheets

(56) References Cited

U.S. PATENT DOCUMENTS

| | | | |
|---|---|---|---|
| 2010/0061601 A1* | 3/2010 | Abramoff | G06K 9/00617 |
| | | | 382/117 |
| 2013/0132402 A1* | 5/2013 | Yang | G06F 16/5838 |
| | | | 707/748 |
| 2014/0152762 A1* | 6/2014 | Ukil | G06T 3/4038 |
| | | | 348/36 |
| 2014/0270537 A1* | 9/2014 | Lo | G06T 11/60 |
| | | | 382/195 |

* cited by examiner

METHOD FOR IMAGE STITCHING

FIELD

The invention relates to the field of image processing, especially to stitching of images.

BACKGROUND

Image stitching is a process of creating a seamless composite image from a set of images. Conventional stitching method starts with pairwise matching of images that partially overlap, and a transformation is determined between the pixel coordinates of the image pair. If the overlapping region of the image pair comprises repetitive patterns, or lacks detail, the conventional method may have difficulties to find correct transformation and point correspondence set for the image pair.

Therefore, there is a need for a new stitching method.

SUMMARY

Various aspects of the invention include a method, an apparatus, and a computer readable medium comprising computer code stored therein, which are characterized by what is stated in the independent claims. Various embodiments are disclosed in the dependent claims.

According to a first aspect of the present disclosure, there is provided a method comprising: receiving at least three images, wherein the images form a number of partially overlapping image pairs, wherein the number of partially overlapping image pairs is at least a number of the received images; forming one or more candidate transformations between the images of the image pairs; constructing a multigraph comprising nodes representing nodal transformations from a composite image to the images of the at least three images, and edges between the nodes, the edges representing the one or more candidate transformations; solving edge weights and the nodal transformations using an optimization problem, wherein the edge weights indicate plausibility of the one or more candidate transformations; and applying the solved nodal transformations in forming the composite image of the at least three images.

According to an embodiment, the method further comprises adding a dummy edge between two nodes, wherein the dummy edge has a weight indicating a possibility that none of the one or more candidate transformations between two nodes is a match.

According to an embodiment, a type of the transformations is a continuously differentiable bijection.

According to an embodiment the optimization problem is formulated as a non-linear minimization problem with linear equality constraints.

According to an embodiment, the method further comprises pruning the multigraph to obtain a pruned simple graph.

According to an embodiment, the pruning comprises selecting one of the one or more candidate transformations based on the edge weights to obtain a selected transformation between the images of the image pairs.

According to an embodiment, the selecting one of the one or more candidate transformations based on the edge weights comprises selecting the candidate transformation having the largest weight.

According to an embodiment, the selecting one of the one or more candidate transformations based on the edge weights comprises discarding, in response to the weight of the dummy edge being the largest, the one or more candidate transformations and selecting none of the transformations for the given edge.

According to a second aspect, there is provided an apparatus comprising at least one processing core, at least one memory including computer program code, the at least one memory and the computer program code being configured to, with the at least one processing core, cause the apparatus to perform at least: receiving at least three images, wherein the images form a number of partially overlapping image pairs, wherein the number of partially overlapping image pairs is at least a number of the received images; forming one or more candidate transformations between the images of the image pairs; constructing a multigraph comprising nodes representing nodal transformations from a composite image to the images of the at least three images, and edges between the nodes, the edges representing the one or more candidate transformations; solving edge weights and the nodal transformations using an optimization problem, wherein the edge weights indicate plausibility of the one or more candidate transformations; and applying the solved nodal transformations in forming the composite image of the at least three images.

According to an embodiment, the apparatus is further caused to perform adding a dummy edge between two nodes, wherein the dummy edge has a weight indicating a possibility that none of the one or more candidate transformations between two nodes is a match.

According to an embodiment, the apparatus is further caused to perform pruning the multigraph to obtain a pruned simple graph.

According to a third aspect, there is provided a non-transitory computer readable medium having stored thereon a set of computer readable instructions that, when executed by at least one processor, cause an apparatus to perform at least: receiving at least three images, wherein the images form a number of partially overlapping image pairs, wherein the number of partially overlapping image pairs is at least a number of the received images; forming one or more candidate transformations between the images of the image pairs; constructing a multigraph comprising nodes representing nodal transformations from a composite image to the images of the at least three images, and edges between the nodes, the edges representing the one or more candidate transformations; solving edge weights and the nodal transformations using an optimization problem, wherein the edge weights indicate plausibility of the one or more candidate transformations; and applying the solved nodal transformations in forming the composite image of the at least three images.

DETAILED DESCRIPTION

Image stitching is a process of creating a seamless composite image from a set of images. Stitching may be needed in various applications such as in medical imaging, creating panorama images, satellite imaging, and in microscopic scanning applications. The examples presented herein are related to microscopic scanning applications, wherein multiple images captured from different positions on the slide need to be combined into a final image, i.e. a composite image.

Figure 1:
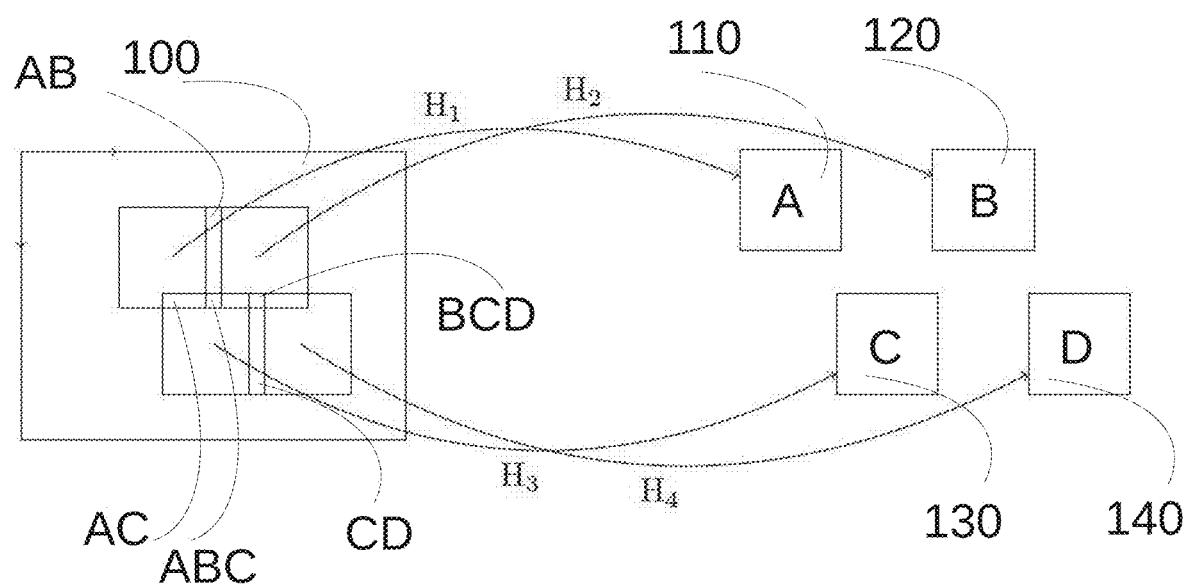
FIG. 1 shows, by way of an example, transformations from a composite image to individual images.

Aim of a stitching process is to find a transformation from the composite image to individual images in order to render the corresponding region in the composite image. FIG. 1 shows, by way of an example, transformations from a composite image 100 to individual images A 110, B 120, C 130, D 140. As shown in FIG. 1, the individual images A 110, B 120, C 130, D 140 are overlapping images in the composite image. For example, the image A 110 partially overlaps with the image B 120. The overlapping area AB is shown in FIG. 1. Image A 110 also overlaps with image C 130, which is illustrated by the overlapping area AC. Image C 130 partially overlaps with the image D 140, which is illustrated by the overlapping area CD. Overlapping area ABC describes partial overlap of the images A, B and C. Further, the image C 130 partially overlaps with the image B, and the image B 120 partially overlaps with the image D 140. Overlapping area BCD describes partial overlap of the images B, C and D. Transformations $H_1$, $H_2$, $H_3$ and $H_4$ represent transformations between the composite image pixel coordinates and the pixel coordinates of the individual images A 110, B 120, C 130, D 140, respectively.

Conventional method for stitching starts with pairwise matching of images that partially overlap. The matching is based on finding closely resembling feature point pairs on the overlapping regions to determine a transformation between the pixel coordinates of the image pair, for example between images A 110 and B 120. A robust estimation method, such as RANSAC, may be used to find the transformation together with a set of true point correspondences. Other examples of robust estimation methods are the derivatives of RANSAC, e.g. MLESAC and MAPSAC, and the family of M-estimators. Pairwise transformations constitute edges in a connectivity graph, which in the conventional method is a simple graph. Nodes of the graph represent the unknown transformations from the composite image pixel coordinates to pixel coordinates of the individual images. Once the image pair matches are found, the transformations from the composite image to individual images are solved by minimizing the transformation error between the feature point correspondences in the connectivity graph. This step is often called global alignment or bundle adjustment. The solved transformations may then be used in image warping to render the composite image.

The conventional method easily produces an incorrect transformation and point correspondence set for the image pair in situations, wherein the overlapping region of the image pair contains a repetitive texture or feature pattern, or lacks any detail, i.e. is featureless. In these situations, a false and a true set of point correspondences might seem equally likely in terms of feature point pair similarity and correspondence set size. The false correspondences cause visible stitching artifacts in the composite image, as the edge transformations in the connectivity graph contain conflicting or false information. For example, a cycle of transformations in the connectivity graph does not necessarily produce an identity transformation if the correspondences are false.

Figure 2:
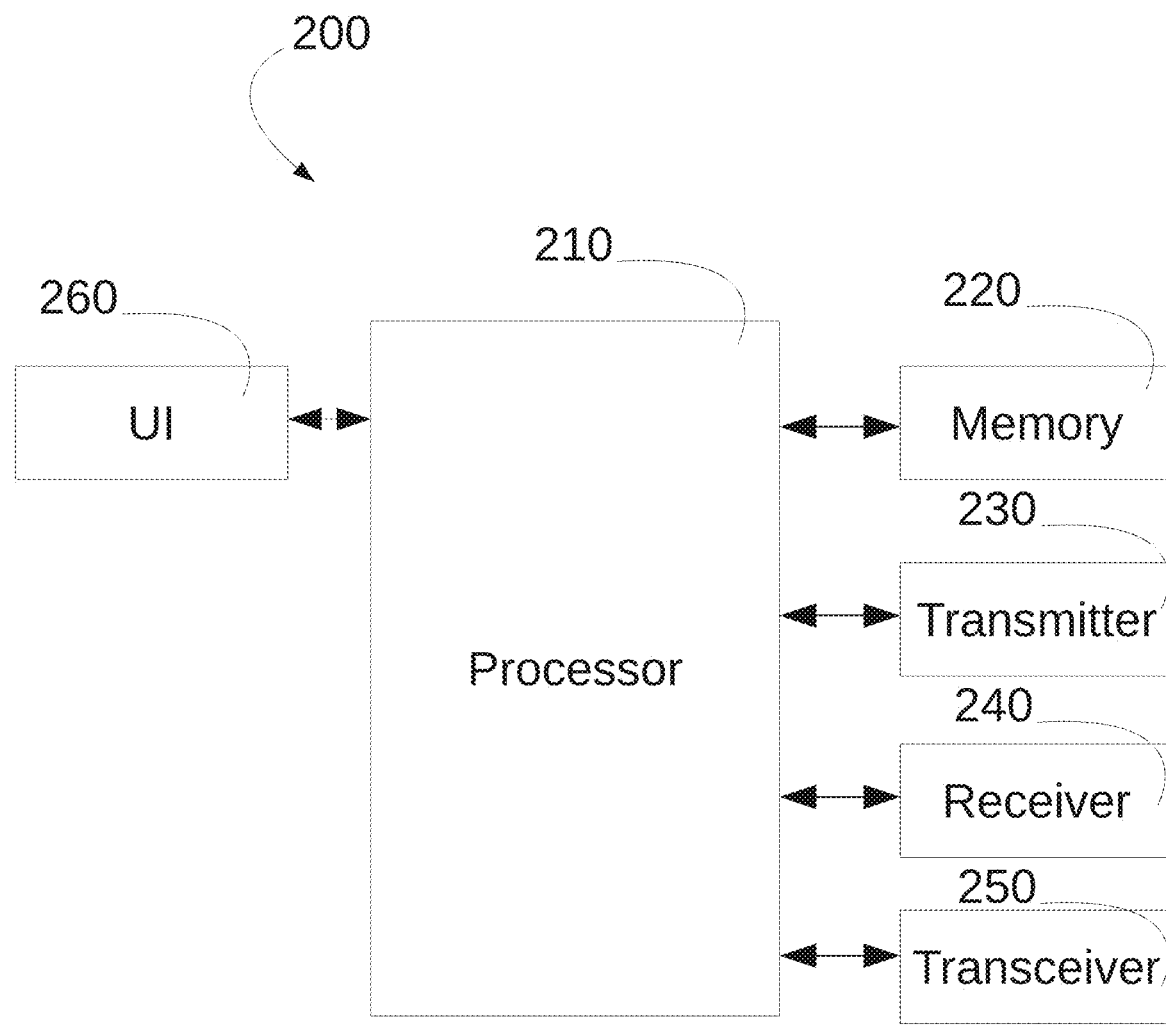
FIG. 2 shows, by way of an example, a block diagram of an apparatus for image stitching.

Stitching method as presented herein is robust against repetitive patterns in the imagery, and/or robust against otherwise false pairwise matches. FIG. 2 shows, by way of an example, a block diagram of an apparatus 200 for image stitching. The apparatus may perform the method as presented herein. The apparatus may be e.g. an image capture device, or a device comprising a digital camera, by which the individual images are captured. For example, the apparatus may be a scanning apparatus such as a microscope scanner, or a mobile phone such as a smartphone comprising one or more cameras. Alternatively, the apparatus performing the method may be an external device such as a computer or a server which may receive the images to be stitched, e.g. from an image capture device, from a database, or from a memory device. Comprised in device 200 is processor 210, which may comprise, for example, a single- or multi-core processor wherein a single-core processor comprises one processing core and a multi-core processor comprises more than one processing core. Processor 210 may comprise, in general, a control device. Processor 210 may comprise more than one processor. Processor 210 may be a control device. Processor 210 may be means for performing method steps in device 200. Processor 210 may be configured, at least in part by computer instructions, to perform actions.

Device 200 may comprise memory 220. Memory 220 may comprise random-access memory and/or permanent memory. Memory 220 may comprise at least one RAM chip. Memory 220 may comprise solid-state, magnetic, optical and/or holographic memory, for example. Memory 220 may be at least in part accessible to processor 210. Memory 220 may be at least in part comprised in processor 210. Memory 220 may be means for storing information. Memory 220 may comprise computer instructions that processor 210 is configured to execute. When computer instructions configured to cause processor 210 to perform certain actions are stored in memory 220, and device 200 overall is configured to run under the direction of processor 210 using computer instructions from memory 220, processor 210 and/or its at least one processing core may be considered to be configured to perform said certain actions. Memory 220 may be at least in part comprised in processor 210. Memory 220 may be at least in part external to device 200 but accessible to device 200.

Device 200 may comprise a transmitter 230. Device 200 may comprise a receiver 240. Transmitter 230 and receiver 240 may be configured to transmit and receive, respectively, information in accordance with at least one cellular or non-cellular standard. Transmitter 230 may comprise more than one transmitter. Receiver 240 may comprise more than one receiver. Transmitter 230 and/or receiver 240 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 200 may comprise a near-field communication, NFC, transceiver 250. NFC transceiver 250 may support at least one NFC technology, such as NFC, Bluetooth, Wibree or similar technologies.

Device 200 may comprise user interface, UI, 260. UI 260 may comprise at least one of a display, a keyboard, and a touchscreen. A user may be able to operate device 200 via UI 260, for example to manage digital files stored in memory 220 or on a cloud accessible via transmitter 230 and receiver 240, or via NFC transceiver 250.

Processor 210 may be furnished with a transmitter arranged to output information from processor 210, via electrical leads internal to device 200, to other devices comprised in device 200. Such a transmitter may comprise a serial bus transmitter arranged to, for example, output information via at least one electrical lead to memory 220 for storage therein. Alternatively to a serial bus, the transmitter may comprise a parallel bus transmitter. Likewise processor 210 may comprise a receiver arranged to receive information in processor 210, via electrical leads internal to device 200, from other devices comprised in device 200. Such a receiver may comprise a serial bus receiver arranged to, for example, receive information via at least one electrical lead from receiver 240 for processing in processor 210. Alternatively to a serial bus, the receiver may comprise a parallel bus receiver.

Figure 3:
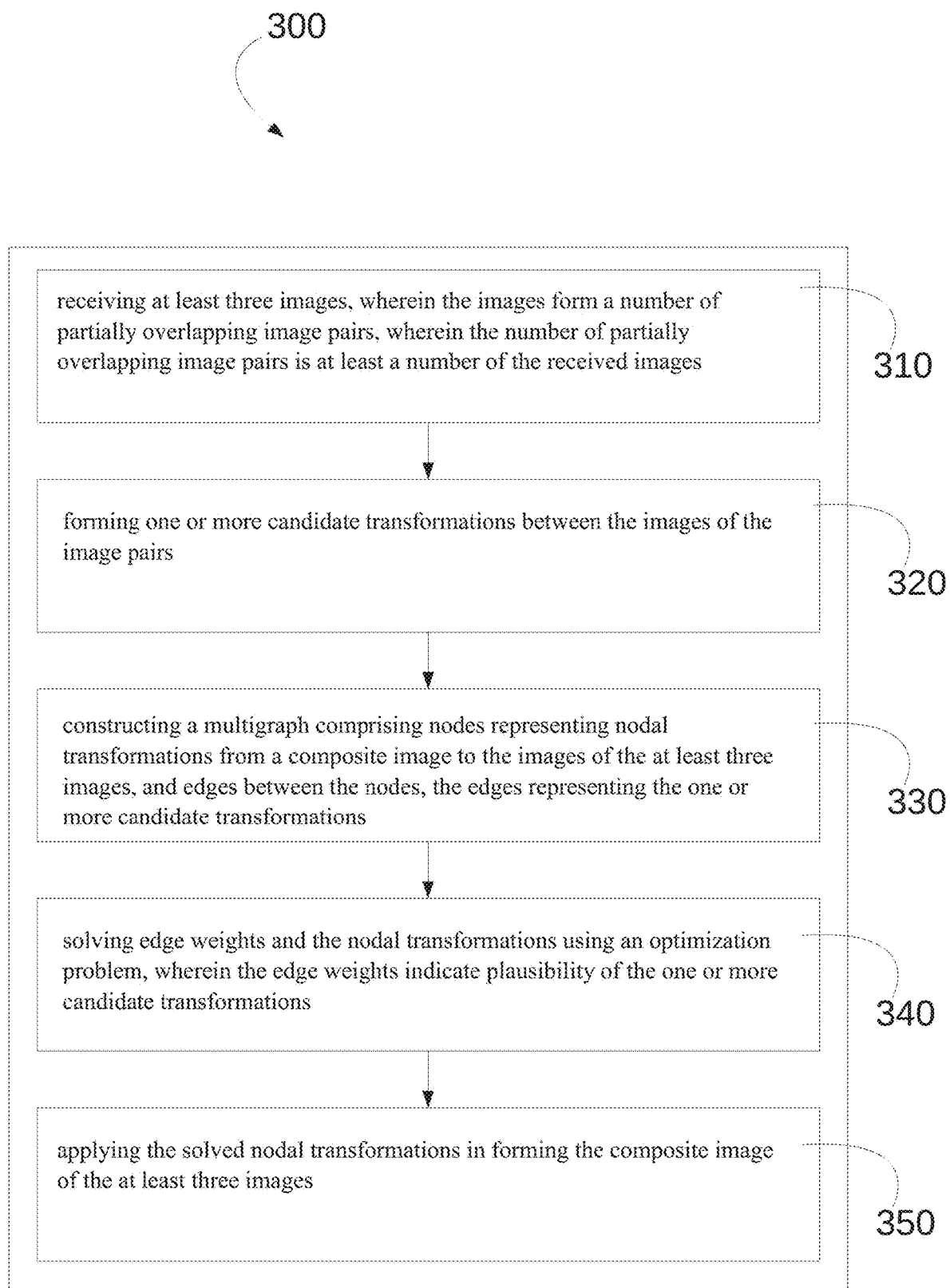
FIG. 3 shows, by way of an example, a flowchart of a method for image stitching.

FIG. 3 shows, by way of an example, a flowchart of a method for image stitching. The phases of the illustrated method may be performed in the apparatus, e.g. the scanning apparatus or a smartphone, or a personal computer, or in a control device configured to control the functioning thereof, when installed therein. The method 300 comprises receiving 310 at least three images, wherein the images form a number of partially overlapping image pairs, wherein the number of partially overlapping image pairs is at least a number of the received images. The method 300 comprises forming 320 one or more candidate transformations between the images of the image pairs. The method 300 comprises constructing 330 a multigraph. The multigraph comprises nodes representing nodal transformations from a composite image to the images of the at least three images, and edges between the nodes, the edges representing the one or more candidate transformations. The method 300 comprises solving 340 edge weights and the nodal transformations using an optimization problem, wherein the edge weights indicate plausibility of the one or more candidate transformations. The method 300 comprises applying 350 the solved nodal transformations in forming the composite image of the at least three images.

The method as presented herein is robust against repetitive patterns in the imagery, and/or robust against otherwise false pairwise matches. By using the method for image stitching, stitching artifacts may be avoided. False feature matches in the pairwise image matching phase that are in conflict within the global connectivity graph may be avoided by the method as presented herein. The method collects plausible pairwise image matches and determines the correct ones to that they are globally consistent.

The method will be explained here in detail, referring also to the FIG. 4A. The method 300 comprises receiving 310 at least three images. The images form a number of partially overlapping image pairs, wherein the number of partially overlapping image pairs is at least a number, or a quantity, of the received images. For example, in case of three images, they form at least three image pairs, and in case of four images, they form at least four image pairs. The at least three images may comprise a first image, a second image and a third image. The first image, the second image and the third image may form partially overlapping image pairs. For example, the first image and the second image may be partially overlapping, the second image and the third image may be partially overlapping, and the third image and the first image may be partially overlapping. In some cases, all three images may have a common overlapping region.

In case of four images, the first and the second image may overlap and form a pair; the second and third image may overlap and form a pair; the third and fourth image may overlap and form a pair; and the fourth and first image may overlap and form a pair. In addition, the second and fourth image may overlap and form a pair, and/or the first and third image may overlap and form a pair.

The first image, the second image and the third image may belong to a set of images that are to be stitched in order to form a composite image. The set of images comprises a plurality of images. For example, when scanning a specimen using a scanning microscope, multiple high-resolution images are captured from the specimen. The captured images are so called sub-images. Some of the sub-images may be partially overlapping. It may be determined beforehand which images overlap, e.g. from the known movement of the specimen stage. The sub-images may be combined by stitching to form a final image of the specimen. The at least three images may be received for processing e.g. from the memory of the apparatus, wherein the captured sub-images have been stored. The apparatus may be a scanning apparatus such as a digital microscope scanner. Alternatively, the images may be received e.g. from a database, which may be an external server storing the images, or from a memory device.

The method 300 comprises forming 320 one or more candidate transformations between the images of the image pairs. For example, one or more candidate transformations $H_{12,1}$, $H_{12,2}$ may be formed between the first image pixel coordinates and the second image pixel coordinates, one or more candidate transformations $H_{13}$ may be formed between the first image pixel coordinates and the third image pixel coordinates, and one or more candidate transformations $H_{23}$ may be formed between the third image pixel coordinates and the second image pixel coordinates. The pairwise matching phase finds plausible transformations between images of an image pair ij, e.g. between images of each image pair. A first image pair may comprise the first image and the second image. A second image pair may comprise the first image and the third image. A third image pair may comprise the third image and the second image. For example, all plausible transformations $\{H_{i,j,k}\}_k$ may be formed from image i pixel coordinates to image j pixel coordinates. Index k indicates the candidate transformation. It is to be understood that the direction of the transformation may be opposite, i.e. the inverse transformation $H_{ji}$ of $H_{ij}$ may be used Any method for finding the set $\{H_{i,j,k}\}_k$ of plausible transformations, i.e. candidate transformations, between the image pairs may be used. For example, RANSAC or some other robust estimation method may be modified to produce multiple point correspondence consensus sets. In a scanning application, where the transformations are primarily approximately known translations, all the translations corresponding to strong local maxima of the image cross-correlation may be added to the set of plausible transformations.

When the transformations are primarily translations, given a set of distinctive feature points $\{x_p\}$ in the first image of an image pair, the local maxima of the Pearson correlation coefficient may be used to find the candidate transformations:

$$\rho_{ij}(\Delta x) = \frac{1}{N} \sum_{p=1}^{N} \frac{\sum (I_i(x_p) - \bar{I}_i(x_p))(I_j(x'_p) - \bar{I}_j(x'_p))}{\sqrt{\sum (I_i(x_p) - \bar{I}_i(x_p))^2 \sum (I_j(x'_p) - \bar{I}_j(x'_p))^2}}, \quad (1)$$

where p is the indexing of the feature points, $I_i(x)$ and $\bar{I}_i(x)$ denote the image i pixel value at x and the mean value around a neighbourhood of x, respectively, and $x'_p = x_p + \Delta x_0 + \Delta x$ holds, where $\Delta x$ is the deviation from the initial translation estimate $\Delta x_0$. The sums and means may be taken on a square window around each feature point. The local maxima $\{\Delta x_k\}$ of the function $\rho_{ij}(\Delta x)$ over some pre-defined threshold are found and the corresponding set $\{x_p \leftrightarrow x_p + \Delta x_0 + \Delta x_k\}$ of the feature points $x_p$ for each maxima k are selected as candidate matches between the images $I_i$ and $I_j$.

The transformation $H_{i,j,k}$ may be considered to be perspective transformation. The transformation may be represented by a 3×3-matrix acting on homogeneous pixel coordinates. However, the method generalizes to continuously differentiable and bijective change of coordinates between the images. The method also specializes to mere translations between the images, which is a special case of a perspective transformation.

Usually, it is not necessary to match all the possible image pairs with each other, since it is often known in advance which images actually overlap. Referring to the example of FIG. 1, it may be known in advance that the images A 110 and D 140 do not overlap. Approximate camera motion may be used to determine which images overlap, and between which images the transformations are to be formed. For example in the scanning application, the approximate movement of the specimen stage may be known from the stage motor control input, which determines which images overlap. On a mobile phone, accelerometer, gyroscope, and magnetometer outputs can be used to estimate which images overlap.

The method 300 comprises constructing 330 a multigraph. The multigraph may comprise nodes representing nodal transformations $H_1$, $H_2$, $H_3$ from a composite image to the images of the at least three images. For example, nodes represent nodal transformations from the composite image pixel coordinates to the pixel coordinates of the first image, from the composite image pixel coordinates to the pixel coordinates of the second image and from the composite image pixel coordinates to the pixel coordinates of the third image. The multigraph may comprise edges $H_{12,1}$, $H_{12,2}$, $H_{13}$, $H_{23}$ between the nodes, the edges representing the one or more candidate transformations. At least one cycle may be formed in the graph. By constructing a connectivity multigraph, instead of a simple graph, utilization of all the available information from the whole imagery is possible to determine the correct pairwise matches in the stitching process. For example, it is possible to use information on unambiguous matches outside the repeating pattern and featureless regions. Each cycle of transformations in the connectivity graph is required to produce an identity transformation which is enforced by an optimization problem, e.g. a minimization procedure which is described later. If a cycle comprises image regions outside the repeating pattern regions or featureless regions, where unambiguous pairwise can be obtained, the method as presented herein propagates the reliable match information along the cycle to the ambiguous regions. Thus, it is beneficial to have plenty of cycles in the connectivity graph. By constructing a multigraph, the stitching method is robust even if the overlapping region between the image pair is not very large. In the scanning applications, the goal is to have small overlapping regions between the image pair in order to reduce the scanning time.

Figure 4A:
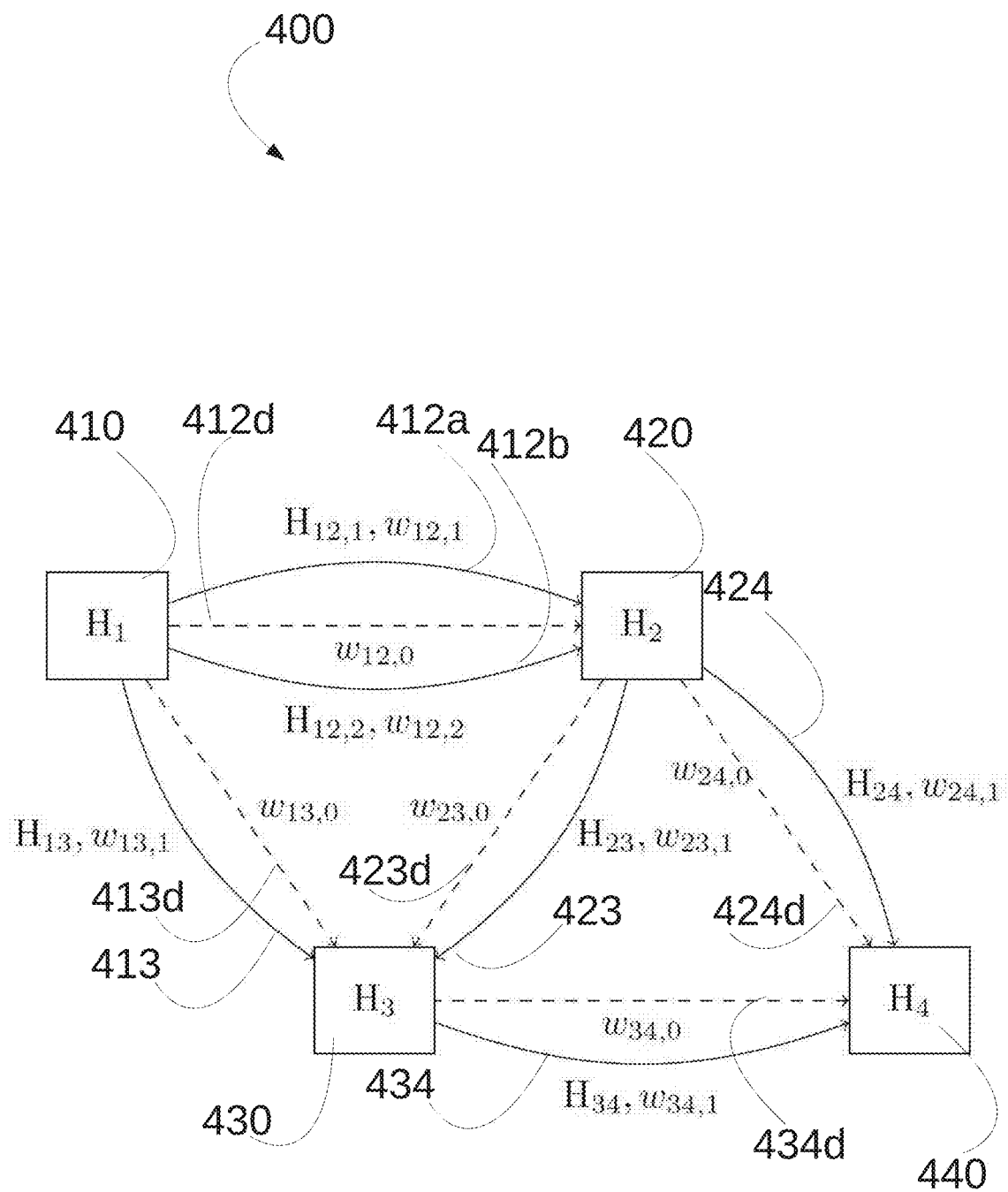
FIG. 4A shows, by way of an example, a connectivity multigraph.

FIG. 4A shows, by way of an example, a connectivity multigraph 400. The edges 412a, 412b, 413, 423, 424, 434 of the multigraph 400 represent the candidate transformations $H_{i,j,k}$ between the image pairs ij. The nodes 410, 420, 430, 440 of the multigraph 400 represent unknown transformations $H_i$, i.e. $H_1$, $H_2$, $H_3$ and $H_4$ from the composite image, i.e. the final image, to the individual images. Transformations $H_i$ from the composite image, i.e. the final image, to the individual images may be called nodal transformations.

Unknown edge weights $w_{i,j,k}$ represent the plausibility of the candidate transformations. The multigraph 400 is a weighted multigraph.

In the example of FIG. 4A, it is shown that there are two transformation candidates $H_{12,1}$ and $H_{12,2}$ (edges 412a and 412b) for the edge 12, i.e. the edge between the nodes 410 and 420. Plausibilities for these candidate transformations are indicated by the weights $w_{12,1}$ and $w_{12,2}$, respectively. For other edges 413, 423, 424, 434 in the example of FIG. 4A, there is one candidate transformation for each edge, i.e. $H_{13}$, $H_{23}$, $H_{24}$, $H_{34}$. Plausibility for these candidate transformations are indicated by weights $w_{13,1}$, $w_{23,1}$, $w_{24,1}$, and $w_{34,1}$, respectively.

Figure 4B:
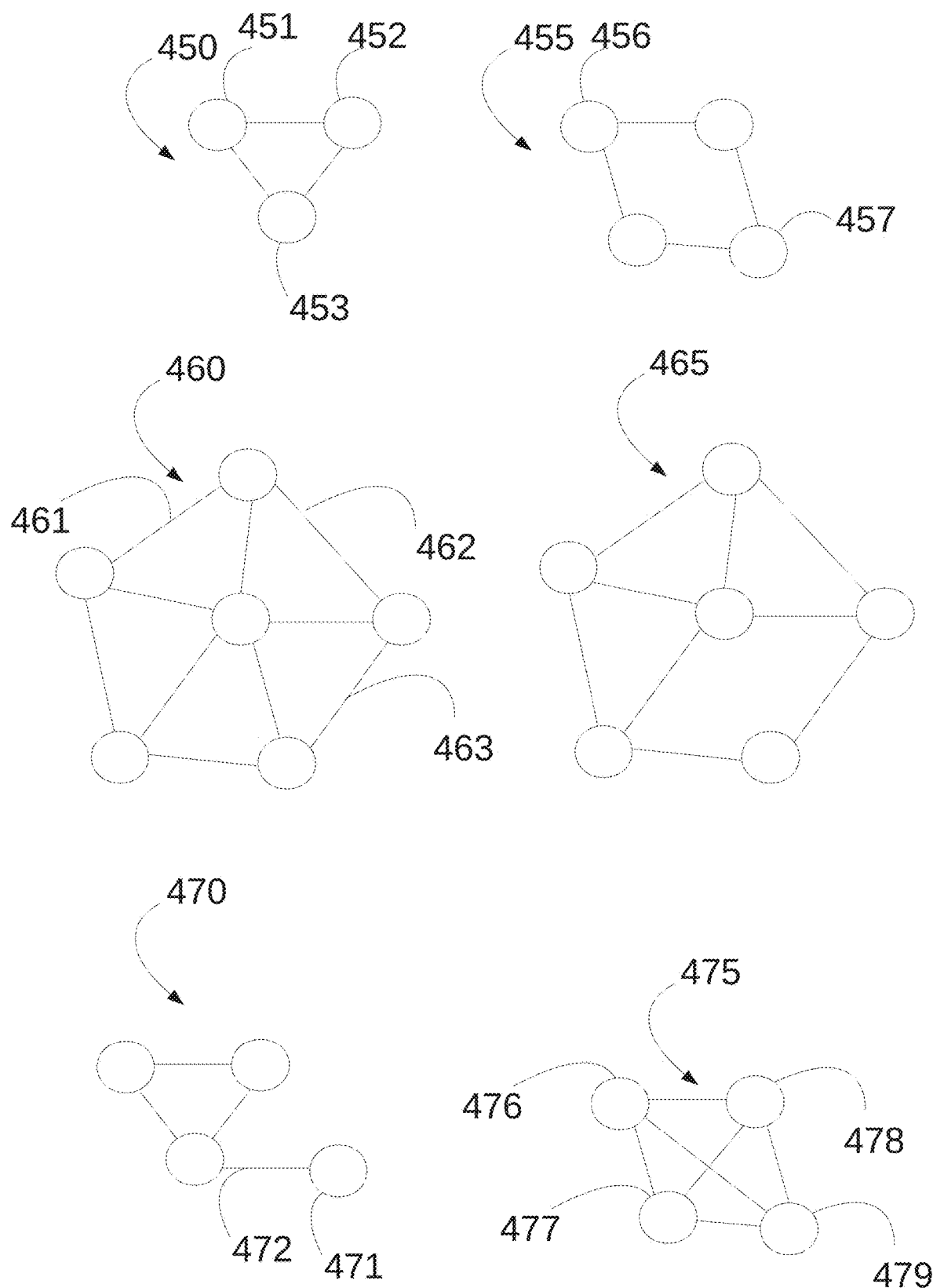
FIG. 4B shows, by way of examples, multigraphs.

FIG. 4B shows, by way of examples, multigraphs 450, 455, 460, 465, 470, 475. The circles 451, 452, 453 represent the nodes of the multigraphs, and the lines 461, 462, 463 the edges of the multigraphs. What is common for these examples of multigraphs is that there is at least one cycle formed in the graph. As can be seen e.g. in the graph 455, it is not necessary to have edges between each node: there is no edge between the nodes 456 and 457, i.e. the sub-images corresponding to those nodes do not form an image pair in this graph. However, in the graph 475, image pairs have been formed between each node 476, 477, 478, 479 of the graph. Graph 470 shows an example graph with four nodes, wherein one node 471 and one edge 472 form a so call branch, and other nodes and edges form a cycle. Node 471 is connected to the graph via edge 472.

The method 300 comprises solving 340 edge weights and the nodal transformations using an optimization problem, e.g. an equality constrained minimization problem, wherein the edge weights indicate plausibility of the one or more candidate transformations. Minimization problem may be, alternatively, trivially formed as a maximization problem. The equality constrained minimization problem may be solved using a projection method that is described later with reference to equations (6) and (8). Once the multigraph has been constructed, the edge weights $w_{i,j,k}$ and the nodal transformations $H_i$ are solved. This global alignment phase finds an agreement between the pairwise matches, filtering out the pairwise transformations that fit poorly to the rest of the connectivity graph.

The edge weights and the nodal transformations may be solved simultaneously from the following non-linear minimization problem with linear equality constraints:

$$\min_{h,w} f(h,w) = \min_{\{H\},\{w\}} \Sigma_{i<j} (w_{i,j,0}^2 \tau^2 + \Sigma_{k=1}^{Ne} w_{i,j,k}^2 \|H_{i,j,k} H_i - H_j\|^2), \quad (2)$$

subject to $\Sigma_{k=0}^{Ne} w_{i,j,k} = 1 \; \forall ij, \; i<j,$ (3)

where the vectors h and w represent the unknown parameters of the nodal transformations $H_i$ and the unknown edge weights $w_{i,j,k}$, respectively, and $\tau$ is a fixed threshold. The threshold τ and the weight $w_{i,j,0}$ will be further described with reference to the use of dummy edges. The norm $\|\cdot\|$ is chosen to be suitable for the given application and for the type of the transformations $H_i$. For example, in the case of pure translations, the Euclidean 2-norm $\|\Delta x\|$ of the translation vector may be chosen. In the scanning applications, the transformations are primarily translations. Other types of transformations, such as rotation and scaling, are typically small in the scanning applications, or they are not present at all. In case of freely moving cameras or spherical images captured by e.g. omnidirectional cameras, or by 360-degree cameras, or by 720-degree cameras, other types of transformations, such as perspective transformations or lens distortion correction transformations, may be needed to be taken into account.

The rationale of this minimization problem is to find from each set $\{H_{i,j,k}\}_k$ of edge transformations, i.e. candidate transformations, between two nodes i and j the transformation $H_{i,j,k}$ that is the best fit with respect to the rest of the graph. The plausibility of the $H_{i,j,k}$ is given by the weight $w_{i,j,k}$. According to the weight constraint expressed by the equation (3), the edge weights of the set of edges between two nodes sum to one, or any other non-zero value. This is to avoid the trivial minima at w=0.

The constraint equation (3) may be expressed as a matrix equation Jw=1, where the matrix J consists of ones and zeros and 1 is a vector of ones. For example, for the multigraph 400 of FIG. 4A

$$Jw = \begin{bmatrix} 1 & 1 & 1 & 0 & 0 & 0 & 0 & 0 & 0 & 0 \\ 0 & 0 & 0 & 1 & 1 & 0 & 0 & 0 & 0 & 0 \\ 0 & 0 & 0 & 0 & 0 & 1 & 1 & 0 & 0 & 0 \\ 0 & 0 & 0 & 0 & 0 & 0 & 0 & 1 & 1 & 0 & 0 \\ 0 & 0 & 0 & 0 & 0 & 0 & 0 & 0 & 1 & 1 \end{bmatrix} \begin{bmatrix} w_{12} \\ w_{13} \\ w_{23} \\ w_{24} \\ w_{34} \end{bmatrix} = \begin{bmatrix} 1 \\ 1 \\ 1 \\ 1 \\ 1 \end{bmatrix} \quad (4)$$

holds. It follows that in order for an iterative method to minimize the expression (2) subject to the constraint (3), the constrained update $\Delta w_c$ must satisfy $$J\Delta w_c = Jw_{n+1} - Jw_n = 1 - 1 = 0. \quad (5)$$

That is, the update vector $\Delta w_c$ must belong to the null space of J to preserve the constraint on w. Let the columns $z_i$ of a matrix Z form the basis of this null space. Then, $\Delta w_c$ may be expressed as a linear combination $$\Delta w_c = \Sigma_i a_i z_i = Za = ZZ^T \Delta w, \quad (6)$$

where the matrix $ZZ^T$ projects the unconstrained update $\Delta w$ to the null space of J. The update rule $w_{n+1} = \Delta w$ can be replaced with $w_{n+1} = ZZ^T \Delta W$ and the constraint equation (3) is satisfied at each iteration if the initial guess satisfies it.

For example, in the gradient descent method the update rule is $$h_{n+1} = h_n - \gamma_h \nabla_h f, \quad (7)$$

$$w_{n+1} = w_n - \gamma_w ZZ^T \nabla_w f, \quad (8)$$

where $\nabla_h f$ and $\nabla_w f$ denote the gradient vectors of the expression (2) with respect to h and w, respectively, and $\gamma_h$ and $\gamma_w$ are the step sizes. Here, the matrix $ZZ^T$ projects the gradient vector $\nabla'_w f$ to the null space of J.

As the result of the minimization, the nodal transformations $H_i$ are obtained. The nodal transformations may be used as the image warp transformations to create the stitched composite image. The method 300 comprises applying 350 the solved nodal transformations in forming the composite image of at least the first image, the second image and the third image.

Once the nodal transformations $H_i$ are known, the stitched composite image is rendered using a procedure called image warping. For each pixel of the composite image, nodal transformations $H_i$ are used to determine the source sub-image for that pixel. The composite image pixel coordinate is mapped to the each sub-image i by the nodal transformations $H_i$, and for example, the image i for which the sub-image pixel coordinate is closest to the image center coordinate is chosen as the source sub-image for that composite image pixel. Then, the composite image pixel intensity value is interpolated from the source sub-image pixel intensity values surrounding the mapped composite image pixel coordinate on the source sub-image. Any interpolation method can be used, depending on the application and chosen trade-off between the image quality and performance. Typical image interpolation methods include e.g. nearest-neighbour, bilinear, bicubic, and Lanczos interpolations.

The method may further comprise adding a dummy edge between two nodes, wherein the dummy edge has a weight indicating a possibility that none of the one or more candidate transformations between two nodes is a match. Referring to FIG. 4A, the dashed lines 412d, 413d, 423d, 424d, 434d represent the dummy edges between the nodes. The dummy edge may be added to a set of edges between two nodes of the multigraph, or to more than one set of edges between another two nodes, or to each set of edges between all node pairs. The dummy edges have unknown weights $w_{i,j,0}$. The dummy edges 412d, 413d, 423d, 424d, 434d have the weights $w_{12,0}, x_{13,0}, w_{23,0}, w_{24,0}, w_{34,0}$, respectively. The weights of the dummy edges indicate the possibility that none of the given candidate transformations fits well with the rest of the graph. The reference measure for this incompatibility is the threshold τ, which may be pre-defined. The value of i is chosen to be the largest admissible dissimilarity of the transformations measured by the chosen norm $\|\cdot\|$. For example, the value of i may be given as a translation offset in pixels. The use of the dummy edges enables to include more uncertain candidate transformations to the connectivity multigraph, even if they were the only candidates for the given edge. In case no dummy edges are added, and there is only one candidate transformation between two nodes, the weight of that candidate transformation may set to 1, or any other non-zero value.

The method may further comprise discarding the candidate transformations in response to the weight of the dummy edge being the largest when compared to the other weights $w_{i,j,k}$. That is, all the original edges are considered as false matches, if the dummy edge weight is the largest. In this case, no transformation is selected between the corresponding nodes. In other words, no acceptable match was found between the image pair.

The method may further comprise pruning the multigraph to obtain a pruned simple graph, wherein there is at most one edge between the nodes, such that each node remains connected to the graph. If the transformations with less parameters, for example translations, were used in the previous optimization problem, without other degrees of freedom, such as rotation and scaling, the complexity of the computation is reduced as well as the burden of computational resources. More general transformations with more degrees of freedom may be used in the pruning phase, whereupon the computation is less complex. Results of the previous minimization problem may be used to prune the multigraph into a simple weighted graph for which the following global alignment procedure may be applied. The obtained weights $w_{i,j,k}$ may be used as weighting factors associated with the point correspondence sets of the transformations $H_{i,j,k}$, so that only the point correspondence set with the largest weight $w_{ij}=\max_k\{w_{i,j,k}\}$ is used in the global alignment.

The method may comprise selecting one of the one or more candidate transformations based on the edge weights to obtain a selected transformation between the images of the image pairs. For example, the edge with the largest weight may be regarded as a true match, and the corresponding candidate transformation may be selected as the selected transformation.

The following linear unconstrained minimization problem may be solved in the global alignment phase:

$$\min_{\{H_i\}} \Sigma_i \Sigma_j \Sigma_n w_{ij}^2 \|H_i x_{ij}^n - H_j x_{ji}^n\|^2 \qquad (9)$$

where $w_{ij}$ is the largest weight for the edge ij, and the set $\{x_{ij}^n \leftrightarrow x_{ij}^k\}$ is the set of point correspondences with the largest weight $w_{ij}$ for the edge ij.

The problem (9) may be rearranged as $$\min_h \|Ah\|^2, \qquad (10)$$

where h is a stacked column vector of the parameters of the transformations $H_i$. By construction, the null space of A has the dimension of the number of parameters in a transformation $H_i$. That is, one transformation needs to be fixed as the reference for the composite image coordinate system. If the first transformation is selected as the reference, the expression in $H_i$ may be divided into blocks $$Ah = \begin{bmatrix} A_{11} & A_{12} \\ A_{21} & A_{22} \end{bmatrix} \begin{bmatrix} h_1 \\ h_2 \end{bmatrix}, \qquad (11)$$

where $h_1$ is fixed, and the minimization problem is transformed to $$\min_{h_2} \|A_{21} h_1 + A_{22} h_2\|^2, \qquad (12)$$

which has a unique solution $h_2 = (A_{22}^T A_{22})^{-1} A_{22}^T A_{21} h_1$.

Figure 5:
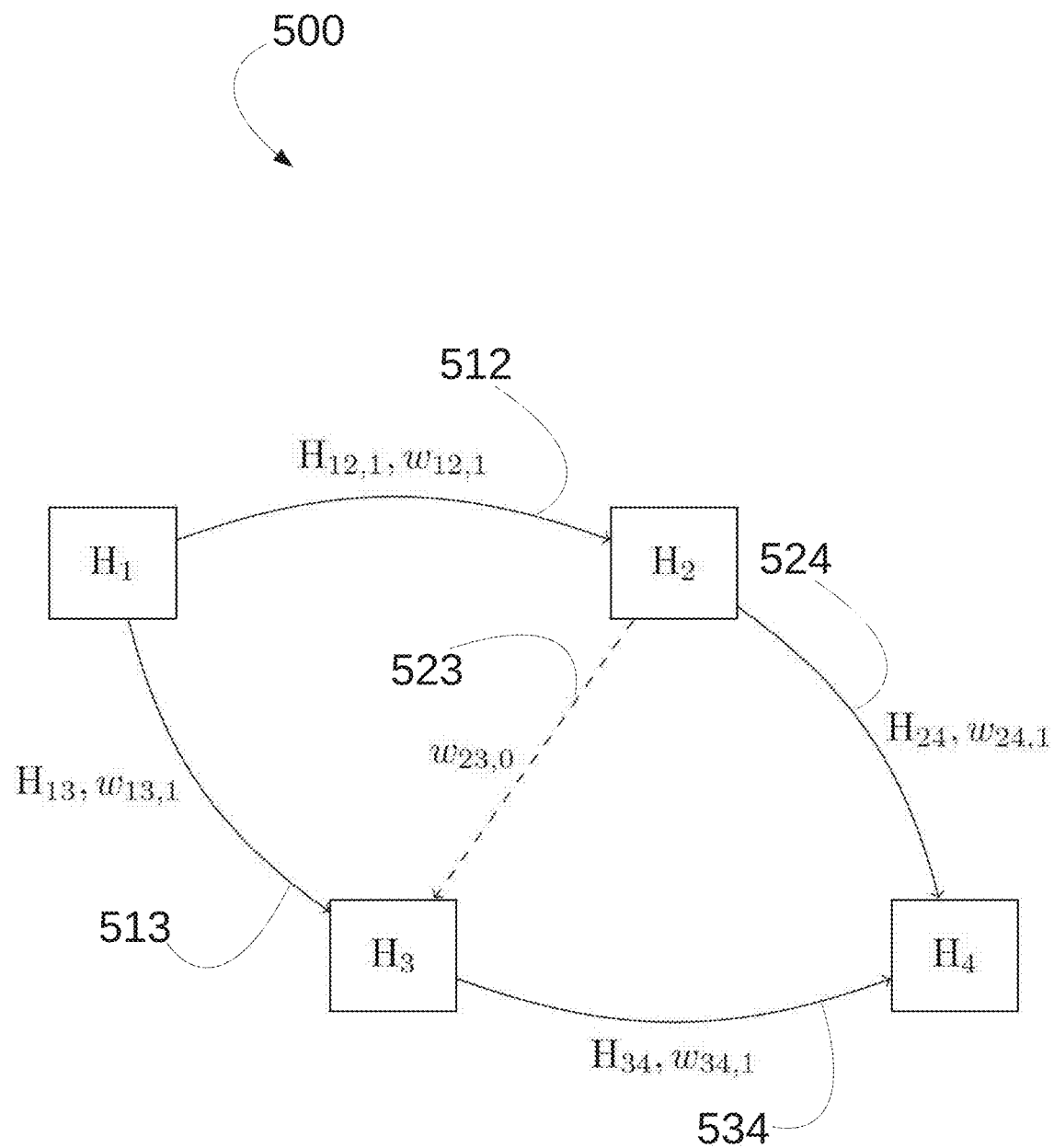
FIG. 5 shows, by way of an example, a pruned simple graph.

FIG. 5 shows, by way of an example, a pruned simple graph 500 from the multigraph 400 of FIG. 4A. In this example, the transformation $H_{12,1}$ has been selected for the edge 12, i.e. the edge 512 in the graph 500, the transformation $H_{13}$ has been selected for the edge 13, i.e. the edge 513 in the graph 500, the transformation $H_{24}$ has been selected for the edge 24, i.e. the edge 524 in the graph 500, and the transformation $H_{34}$ has been selected for the edge 34, i.e. the edge 534 in the graph 500. The candidate transformation $H_{23}$ for the edge 23 was not compatible with the rest of the graph, i.e. the weight $w_{23,1}$ was smaller than the weight $w_{23,0}$ of the dummy edge 423d, and therefore, no transformation has been selected for the edge 23, i.e. the edge 523 in the graph 500. If no transformation has been selected, the global alignment or bundle adjustment phase is carried out without taking into account any of the edge transformation candidates of the edge 23.

Figure 6:
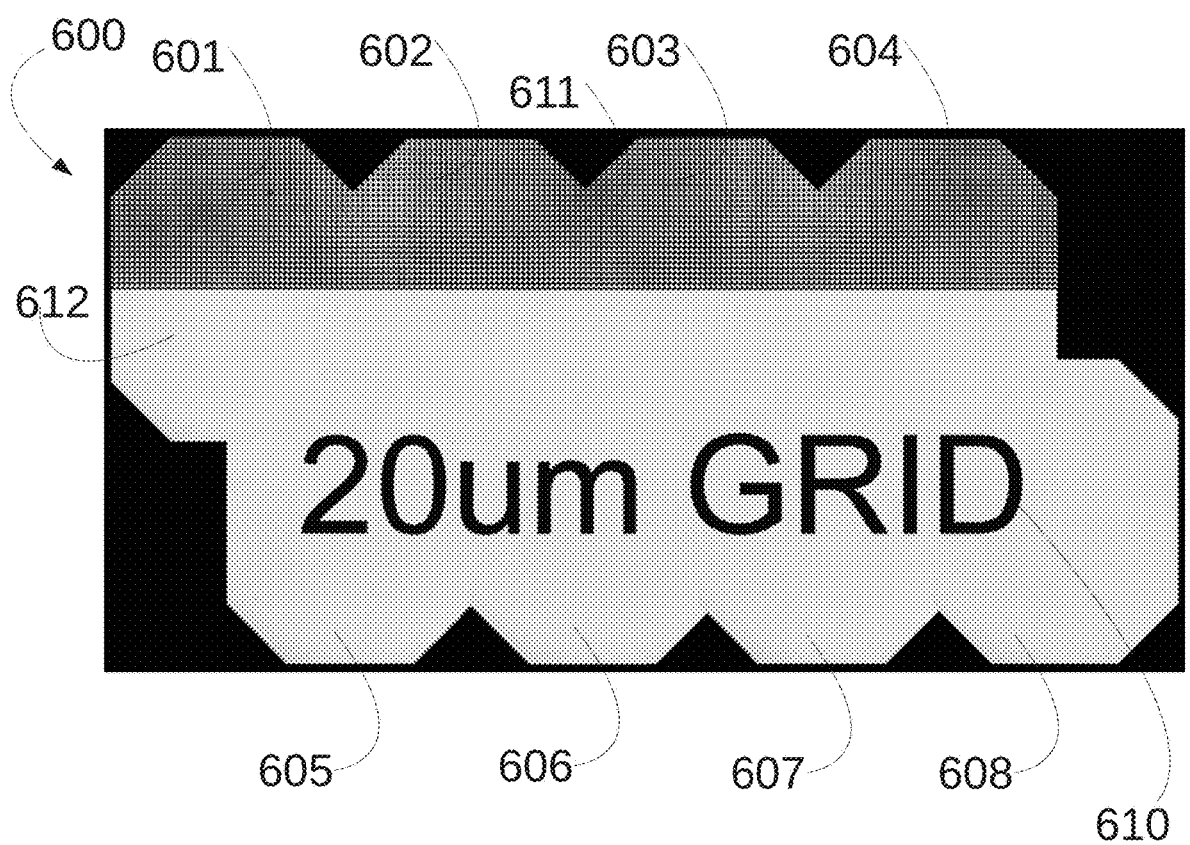
FIG. 6 shows, by way of an example, a composite image.
Figure 6:
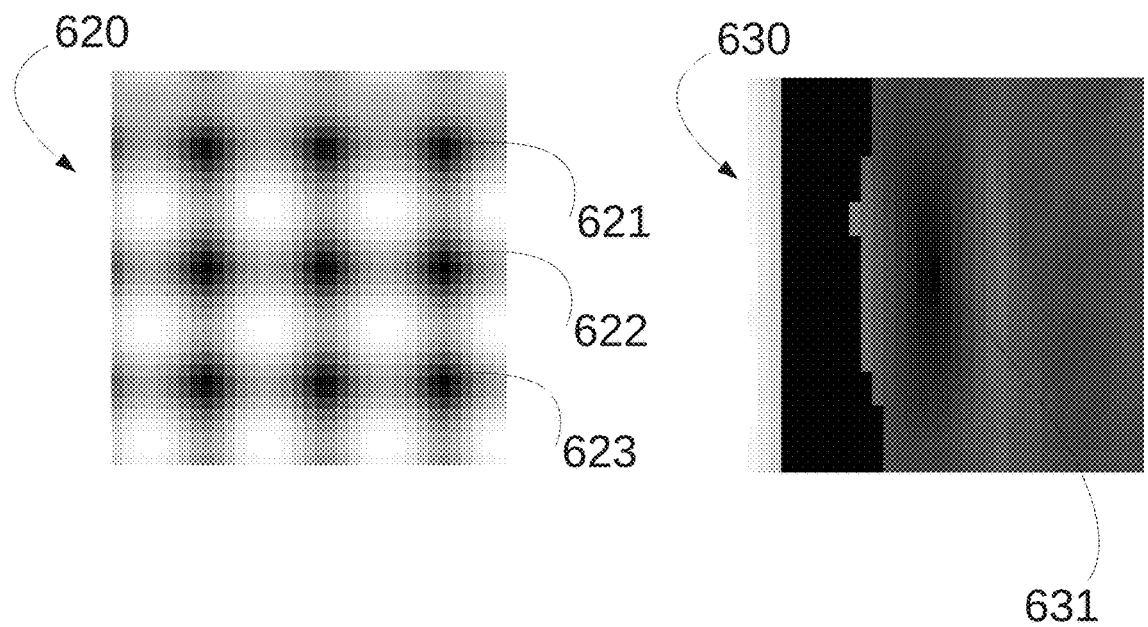

FIG. 6 shows, by way of an example, a composite image 600. The composite image has been stitched together of 8 sub-images 601, 602, 603, 604, 605, 606, 607, 608. The sub-images have been captured using a microscope scanner. The corners of the sub-images are cropped out, since it is typical that the image quality in those regions may be reduced. The sub-images 601, 602, 603, 604 show a grid 611 with repetitive pattern, and also featureless regions 612 under the grid. The sub-images 605, 606, 607, 608 show a text 610 "20 um GRID" and featureless regions surrounding the text.

When trying to find a match between the overlapping areas of the sub-images comprising the grid, one may find several matches that are equally good with different displacements. This means that the correlation between feature points is equally good, or acceptable, with different displacements of two overlapping images, which makes the stitching process difficult. The overlapping featureless regions under the grid are also challenging to match. Using the method discloses herein, it is possible to use other sub-images that have unique point correspondences. In this example, it is possible to find unique point correspondences in the images comprising the text. The multigraph may be constructed in a way that there exist multiple paths between the neighbouring images comprising the grid, so that some paths travel via the images comprising the text, and this way, it is possible to find a good match also between the sub-images comprising the grid.

Image 620 shows, by way of an example, correlations with different displacements corresponding to the image region comprising the grid. As shown by the darker areas 621, 622, 623 in the image 620, there are equal correlations in various points. Image 630 shows, by way of an example, correlations with different displacements corresponding to the image region comprising the text 610. The best correlation is shown by a dark area 631. (The black area on the left is an area for which no correlation has been computed.

An apparatus may comprise means for receiving at least three images, wherein the images form a number of partially overlapping image pairs, wherein the number of partially overlapping image pairs is at least a number of the received images. The apparatus may comprise means for forming one or more candidate transformations between the images of the image pairs. The apparatus may comprise means for constructing a multigraph comprising nodes representing nodal transformations from a composite image to the images of the at least three images, and edges between the nodes, the edges representing the one or more candidate transformations. The apparatus may comprise means for solving edge weights and the nodal transformations using an optimization problem, wherein the edge weights indicate plausibility of the one or more candidate transformations. The apparatus may comprise means for applying the solved nodal transformations in forming the composite image of the at least three images.

The apparatus may comprise means for adding a dummy edge between two nodes, wherein the dummy edge has a weight indicating a possibility that none of the one or more candidate transformations between two nodes is a match.

The apparatus may comprise means for pruning the multigraph to obtain a pruned simple graph.

The means may comprise at least one processor; and at least one memory including computer program code, the at least one memory and computer program code may be configured to, with the at least one processor, cause the performance of the apparatus.

A computer program may be configured to cause a method to be performed. The method comprises receiving at least three images, wherein the images form a number of partially overlapping image pairs, wherein the number of partially overlapping image pairs is at least a number of the received images; forming one or more candidate transformations between the images of the image pairs; constructing a multigraph comprising nodes representing nodal transformations from a composite image to the images of the at least three images, and edges between the nodes, the edges representing the one or more candidate transformations, solving edge weights and the nodal transformations using an optimization problem, wherein the edge weights indicate plausibility of the one or more candidate transformations; and applying the solved nodal transformations in forming the composite image of the at least three images.

The invention claimed is:

1. A method comprising:
receiving at least three images, wherein the images form a number of partially overlapping image pairs, wherein the number of partially overlapping image pairs is at least a number of the received images;
forming one or more candidate transformations between the images of the image pairs;
constructing a multigraph comprising:
nodes representing nodal transformations from a composite image to the images of the at least three images, and
edges between the nodes, the edges representing the one or more candidate transformations,
wherein the multigraph comprises at least one cycle;
solving edge weights and the nodal transformations using an optimization problem, wherein the edge weights indicate plausibility of the one or more candidate transformations; and
applying the solved nodal transformations in forming the composite image of the at least three images.

2. The method according to claim 1, further comprising adding a dummy edge between two nodes, wherein the dummy edge has a weight indicating a possibility that none of the one or more candidate transformations between two nodes is a match.

3. The method according to claim 1, wherein a type of the transformations is a continuously differentiable bijection.

4. The method according to claim 1, wherein the optimization problem is formulated as a non-linear minimization problem with linear equality constraints.

5. The method according to claim 1, further comprising pruning the multigraph to obtain a pruned simple graph.

6. The method according to claim 5, wherein the pruning comprises selecting one of the one or more candidate transformations based on the edge weights to obtain a selected transformation between the images of the image pairs.

7. The method according to claim 6, wherein the selecting one of the one or more candidate transformations based on the edge weights comprises selecting the candidate transformation having the largest weight.

8. The method according to claim 6, wherein the selecting one of the one or more candidate transformations based on the edge weights comprises discarding, in response to the weight of the dummy edge being the largest, the one or more candidate transformations and selecting none of the transformations for the given edge.

9. An apparatus comprising at least one processing core, at least one memory including computer program code, the at least one memory and the computer program code being configured to, with the at least one processing core, cause the apparatus to perform at least:
receiving at least three images, wherein the images form a number of partially overlapping image pairs, wherein the number of partially overlapping image pairs is at least a number of the received images;
forming one or more candidate transformations between the images of the image pairs;
constructing a multigraph comprising:
nodes representing nodal transformations from a composite image to the images of the at least three images, and
edges between the nodes, the edges representing the one or more candidate transformations,
wherein the multigraph comprises at least one cycle;
solving edge weights and the nodal transformations using an optimization problem, wherein the edge weights indicate plausibility of the one or more candidate transformations; and
applying the solved nodal transformations in forming the composite image of the at least three images.

10. The apparatus according to claim 9, further caused to perform adding a dummy edge between two nodes, wherein the dummy edge has a weight indicating a possibility that none of the one or more candidate transformations between two nodes is a match.

11. The apparatus according to claim 9, wherein a type of the transformations is a continuously differentiable bijection.

12. The apparatus according to claim 9, wherein the optimization problem is formulated as a non-linear minimization problem with linear equality constraints.

13. The apparatus according to claim 9, further caused to perform pruning the multigraph to obtain a pruned simple graph.

14. The apparatus according to claim 13, wherein the pruning comprises selecting one of the one or more candidate transformations based on the edge weights to obtain a selected transformation between the images of the image pairs.

15. The apparatus according to claim 14, wherein the selecting one of the one or more candidate transformations based on the edge weights comprises selecting the candidate transformation having the largest weight.

16. The apparatus according to claim 14, wherein the selecting one of the one or more candidate transformations based on the edge weights comprises discarding, in response to the weight of the dummy edge being the largest, the one or more candidate transformations and selecting none of the transformations for the given edge.

17. A non-transitory computer readable medium having stored thereon a set of computer readable instructions that, when executed by at least one processor, cause an apparatus to perform at least:
receiving at least three images, wherein the images form a number of partially overlapping image pairs, wherein the number of partially overlapping image pairs is at least a number of the received images;
forming one or more candidate transformations between the images of the image pairs;
constructing a multigraph comprising:
nodes representing nodal transformations from a composite image to the images of the at least three images, and
edges between the nodes, the edges representing the one or more candidate transformations,
wherein th multigraph comprises at least one cycle;
solving edge weights and the nodal transformations using an optimization problem, wherein the edge weights indicate plausibility of the one or more candidate transformations; and
applying the solved nodal transformations in forming the composite image of the at least three images.

18. The non-transitory computer readable medium according to claim 17, having stored thereon a set of readable instructions that, when executed by at least one processor, cause an apparatus to further perform adding a dummy edge between two nodes, wherein the dummy edge has a weight indicating a possibility that none of the one or more candidate transformations between two nodes is a match.

19. The non-transitory computer readable medium according to claim 17, wherein a type of the transformations is a continuously differentiable bijection.

20. The non-transitory computer readable medium according to claim 17, wherein the optimization problem is formulated as a non-linear minimization problem with linear equality constraints.

* * * * *